(12) United States Patent
Wu et al.

(10) Patent No.: US 12,130,165 B2
(45) Date of Patent: Oct. 29, 2024

(54) CAPACITIVE LIQUID LEVEL SENSOR

(71) Applicant: THERM-O-DISC, INCORPORATED, Mansfield, OH (US)

(72) Inventors: Wenjie Wu, Guangdong (CN); Walter Wu, Guangdong (CN); Qinglu Ma, Guangdong (CN); HaiJian Liang, Guangdong (CN)

(73) Assignee: Therm-O-Disc, Incorporated, Mansfield, OH (US)

( * ) Notice: Subject to any disclaimer, the term of this patent is extended or adjusted under 35 U.S.C. 154(b) by 78 days.

(21) Appl. No.: 17/922,880

(22) PCT Filed: Aug. 27, 2020

(86) PCT No.: PCT/US2020/048276
§ 371 (c)(1),
(2) Date: Nov. 2, 2022

(87) PCT Pub. No.: WO2021/225617
PCT Pub. Date: Nov. 11, 2021

(65) Prior Publication Data
US 2023/0160735 A1 May 25, 2023

(30) Foreign Application Priority Data
May 8, 2020 (CN) .......................... 202020746318.5

(51) Int. Cl.
*G01F 23/263* (2022.01)
(52) U.S. Cl.
CPC .......... *G01F 23/268* (2013.01); *G01F 23/263* (2013.01)

(58) Field of Classification Search
CPC ............................. G01F 23/263; G01F 23/268
See application file for complete search history.

(56) References Cited

U.S. PATENT DOCUMENTS

| | | | |
|---|---|---|---|
| 3,774,238 A * | 11/1973 | Hardway, Jr. | ......... G01F 23/263 73/304 C |
| 8,733,116 B2 | 5/2014 | Won et al. | |
| 9,534,946 B2 | 1/2017 | Murata | |
| 10,025,323 B2 | 7/2018 | Jang et al. | |

(Continued)

FOREIGN PATENT DOCUMENTS

| | | |
|---|---|---|
| CN | 104792387 A | 7/2015 |
| JP | 2016121898 A | 7/2016 |

OTHER PUBLICATIONS

International Search Report and Written Opinion of the ISA issued in PCT/US2020/048276, mailed Nov. 20, 2020; ISA/US.

(Continued)

*Primary Examiner* — Paul M. West
(74) *Attorney, Agent, or Firm* — Harness, Dickey & Pierce, P.L.C.

(57) ABSTRACT

A liquid level sensor having improved performance is disclosed as including a metal cover plate; a conductive pin, the conductive pin penetrating the metal cover plate; a plurality of electrode plates; a plurality of support plates supporting the electrode plates, so that a fixed interval is maintained between the plurality of electrode plates; each electrode plate of the plurality of electrode plates has a wing portion, the wing portion is connected to the conductive pin, and the wing portion extends outward from each electrode plate.

19 Claims, 7 Drawing Sheets

(56) References Cited

U.S. PATENT DOCUMENTS

2014/0352429 A1* 12/2014 Murata .................. G01F 23/26
              73/304 C
2016/0187173 A1   6/2016 Jang et al.
2022/0034699 A1*  2/2022 Roderes ................ G01F 23/268

OTHER PUBLICATIONS

International Preliminary Report on Patentability issued in PCT/US2020/048276, mailed Jul. 20, 2021.
Extended European Search Report for EP209342427, conducted Apr. 26, 2024.

* cited by examiner

CAPACITIVE LIQUID LEVEL SENSOR

CROSS-REFERENCE TO RELATED APPLICATIONS

This application is a U.S. National Phase Application under 35 U.S.C. 371 of International Application No. PCT/US2020/048276, filed on Aug. 27, 2020, which claims the benefit and priority of CN-202020746318.5, filed May 8, 2020. The entire disclosure disclosures of the above application is applications are incorporated herein by reference.

FIELD

The present disclosure relates to the sensor field, and particularly to a liquid level sensor.

BACKGROUND

This section provides background information related to the present disclosure which is not necessarily prior art.

Figure 1:
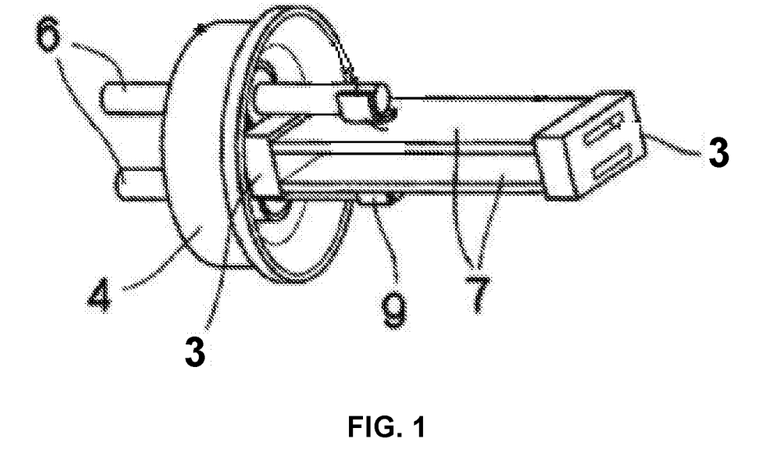
FIG. 1 is a schematic diagram of a liquid level sensor in prior art.

In the prior art, there are several methods for measuring the amount of liquid. The device for measuring the amount of non-conductive liquids such as oil can use an electrostatic capacitive sensor. The sensor is a device that detects the presence and amount of liquid through the following principles: Insulating liquid enters between the electrodes intervening the space, and the electro-static capacitance changes between the electrodes. For example, the electrodes are arranged in a barrel-shaped electrically insulating frame, or one electrode is configured in a barrel shape, and the amount of liquid in the container is measured based on the electrostatic capacitance between the electrodes that changes due to the liquid entering and leaving the barrel. There is another method using a flat capacitive sensor. FIG. 1 is a schematic diagram of a liquid level sensor in prior art. As shown in FIG. 1, a liquid level sensor comprises a conductive rod 6, a metal cover plate 4, a spacer plate 3, a soldering lug 9, and an electrode plate 7. In this way, the connection stability is relatively poor, which affects the accuracy and performance of the sensor.

SUMMARY

This section provides a general summary of the disclosure, and is not a comprehensive disclosure of its full scope or all of its features.

The objective of the present invention lies in providing a liquid level sensor so as to solve the above problem.

According to one aspect of the disclosure, the liquid level sensor includes a metal cover plate, a conductive pin passing through the metal cover plate, a plurality of electrode plates, and a plurality of support plates supporting the plurality of electrode plates respectively, so that a fixed interval or distance is maintained between the plurality of electrode plates. Each electrode plate of the plurality of electrode plates has a planar portion and a wing portion that extends outwardly from the planar portion of the electrode plate. The wing portion is attached or connected to the conductive pin.

Preferably, the wing portion includes a bent portion or bent part and a conductive portion or conductive part.

Preferably, the wing portion is located in the middle of the electrode plates. Alternatively, the wing portion is located at the first end of each electrode plate of the plurality of electrode plates, and the distance between the first end and the metal cover plate is less than the distance between the second end of each electrode plate and the metal cover plate.

Preferably, the conductive portion is connected to the conductive pin.

Preferably, the first surface of the conductive portion is connected to the conductive pin. Alternatively, the second surface of the conductive portion is connected to the conductive pin.

Preferably, one support plate of the plurality of support plates is provided at the first end of the electrode plate, and the other support plate of the plurality of support plates is provided at the second end. Alternatively, one support plate of the plurality of support plates is provided at the second end portion, and the other support plate of the plurality of support plates is provided between the wing portion and the second end portion.

Preferably, the plurality of electrode plates are arranged in parallel.

Preferably, one or more convex parts are provided on the conductive portion.

Through the above technical solutions, a liquid level sensor is disclosed as including a metal cover plate, a conductive pin that passes through the metal cover plate, multiple electrode plates, multiple support plates respectively supporting the plurality of electrode plates so that a fixed interval (i.e., a gap or distance) is maintained between the plurality of electrode plates. Further, each electrode plate of the plurality of electrode plates has a wing portion that extends outwardly from a planar portion of each electrode plate. A conductive pin is attached to each wing portion such as by welding. The wing portion and the electrode plate are integrally formed, and the wing portion is connected to the conductive pin, which improves the stability of the connection between the electrode plate and the conductive pin and improves the working stability of the liquid level sensor.

According to another aspect of the disclosure, a liquid level sensor can include a metal cover having a cap-shaped body member with a generally flat top surface including at least one aperture, a peripheral side wall extending from the top surface and including a flanged portion at a distal perimeter of the side wall. A plurality of conductive pins can extend through the at least one aperture in the top surface of the body member and from a first side of the metal cover to a second side of the metal cover. A sealing glass can be disposed between each of the plurality of pins and the at least one aperture to hermetically seal the pins to the body member and electrically isolate the pins from the body member and one another. A plurality of generally rectangular-shaped electrically-conductive electrode plates extending from the second side of the cover can be included with each of the electrode plates having a planar portion. A plurality of electrically-insulating support plates can support the plurality of electrode plates.

The electrode plates can be positioned in an adjacent relationship to one another such that the planar portions of respective adjacent electrode plates are generally parallel to one another and separated by a predetermined gap.

Additionally, each electrode plate of the plurality of electrode plates can include an integrally-formed wing portion that extends laterally outward from the planar portion of the electrode plate. Each wing portion can have a bent portion and an attachment portion. The attachment portion can be laterally spaced or offset from the planar portion of the electrode plate. Each of the conductive pins of the plurality of conductive pins can be attached to the attachment portion of the wing portion of a corresponding electrode plate of the plurality of electrode plates.

In a further aspect of the disclosure, the planar portions of each of the plurality of electrode plates can have a first thickness and the wing portions of each of the plurality of electrode plates can have a second thickness. The second thickness can be substantially the same as the first thickness. Alternatively, the second thickness can be greater or smaller than the first thickness.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure. The drawings provide a further understanding of the disclosure and form a part of the present application, wherein.

Corresponding reference numerals indicate corresponding parts throughout the several views of the drawings.

DETAILED DESCRIPTION

Example embodiments will now be described more fully with reference to the accompanying drawings. The example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

This disclosure provides various embodiments of a liquid level sensor 2, 5, 8 and 11. With specific reference to FIGS. 8, 9 and 10, an exemplary liquid level sensor 8 can include a first portion or metal cover plate 1001 and a second portion or probe portion 803.

Figure 10:
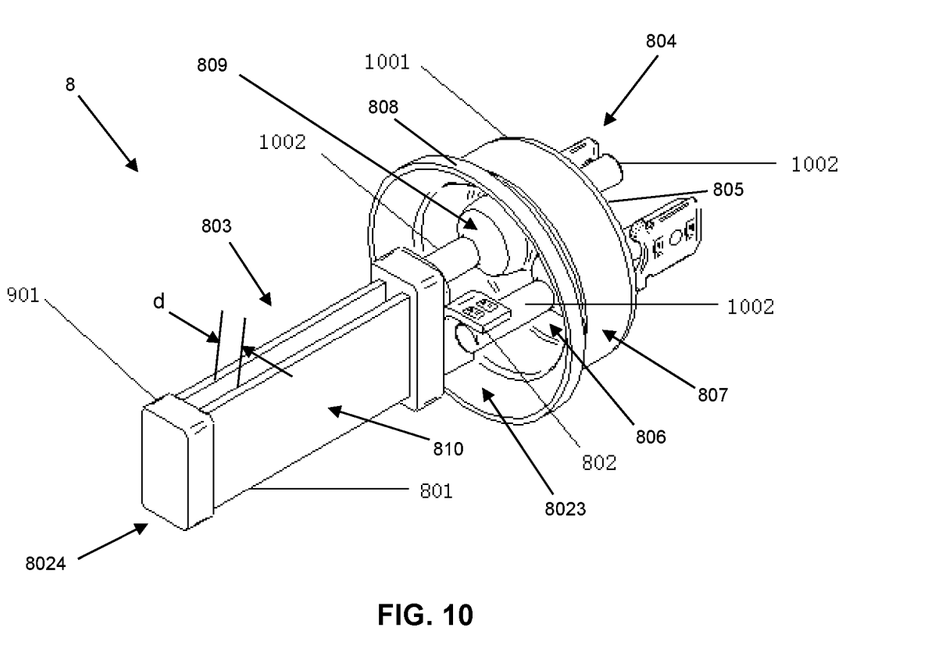
FIG. 10 is a third schematic diagram of a liquid level sensor according to an embodiment of the present disclosure.

The first portion or metal cover plate 1001 can take the form of a hermetic terminal assembly. The first portion can include a cap-shaped metal body member 804 having a generally flat top surface 805 including one or more apertures 806. A peripheral side wall 807 can extend from the top surface and can include a flanged portion 808 at a distal perimeter of the side wall. As shown in the example of FIG. 10, the metal cover plate 1001, peripheral side wall 807, including the flanged portion 808 of the peripheral side wall 807, may define a cavity. One or more electrically conductive pins 1002 can pass through the apertures 806 in the top surface 805 of the body member 804 and extend from a first side of the metal cover plate 1001 to a second side of the metal cover plate 1001. A sealing glass 809 can be disposed between the pins 1002 and the apertures 806 in the body member 804 to hermetically seal the pins 1002 to the body member 804 and electrically isolate to the pins 1002 from the body member 804 and from one another.

Figure 8:
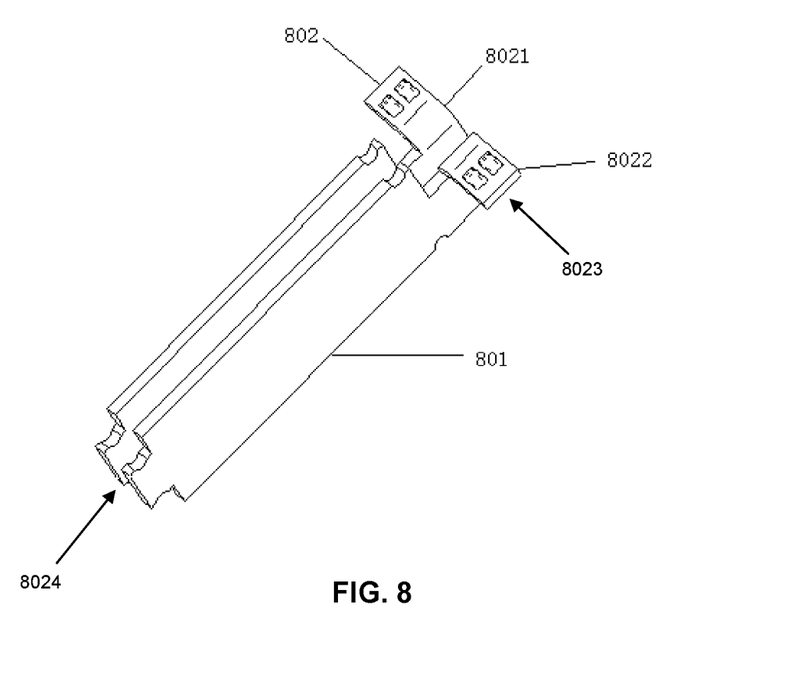
FIG. 8 is a third schematic diagram of an electrode plate according to an embodiment of the present disclosure.
Figure 9:
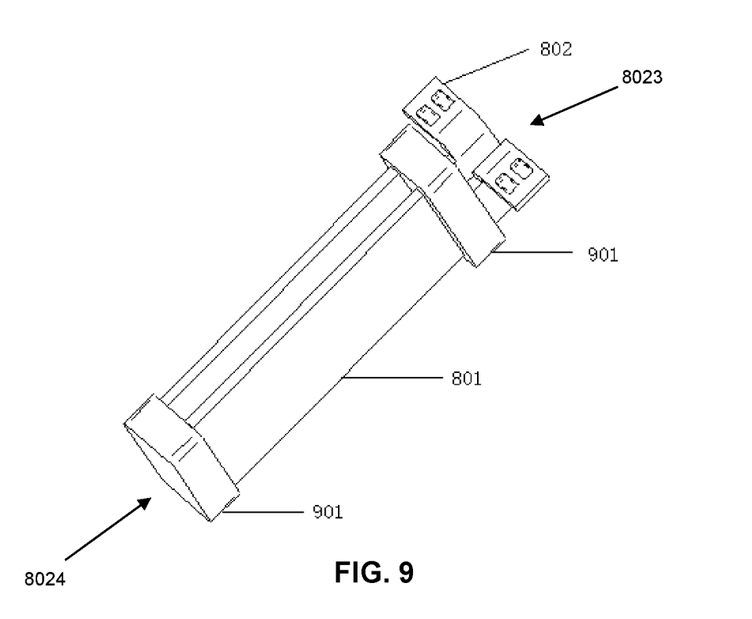
FIG. 9 is a third schematic diagram of a support plate according to an embodiment of the present disclosure.

The second portion or probe portion 803 can include a plurality of generally planar electrode plates 801 located on the second side of the metal cover plate 1001. The electrode plates 801 are supported by a plurality of support plates 901, respectively, so that a fixed gap or distance d can be maintained between the electrode plates 801. Each electrode plate 801 of the plurality of electrode plates 801 includes a planar portion 810 and a wing portion 802. The wing portion 802 extends outwardly from the planar portion 810 of the electrode plate 801. A respective conductive pin 1002 can be electrically connected or attached to the wing portion 802 of a corresponding electrode plate 801.

The liquid level sensor 11 shown in FIGS. 8-10 adopts multiple electrode plates 801 and a plurality of conductive pins 1002. Each electrode plate 801 includes a wing portion 802 that is connected to a respective one of the plurality of conductive pin 1002, such as by welding. The wing portion 802 extends outwardly from the electrode plate 801 and the wing portion 802 can be integrally formed with the electrode plate 801. This configuration improves the stability of the connection between the electrode plate 801 and the conductive pin 802, and improves the stability of the liquid level sensor 11.

As a preferred embodiment, the wing portion 802 comprises a bent portion or bent part 8021 and a conductive portion or conductive part 8022. As previously described, the wing portion 802 may be integrally formed with the electrode plate 801. For example, the electrode plate 801 and wing portion 802, including the bent part 8021 and the conductive part 8022, may be formed from the same material. For example, the electrode plate 801 may be formed from a first material, the bent part 8021 of the wing portion 802 may be formed from a second material, and the conductive part 8022 of the wing portion 802 may be formed from a third material. The first material, second material, and third material may be substantially the same, and have the same fundamental properties, including but not limited to electrical conductivity and resistance, thermal conductivity, and modulus of elasticity. In this preferred embodiment, the bent part 8021 can provide a certain amount of metal elasticity, and provide buffer elasticity for the electrode plate 801 and the connected conductive pin 1002, and in various working environments of the liquid level sensor 11. In this way, the stability of the connection between the electrode plate 801 and the conductive pin 1002 is improved. The conductive part 8022 of the wig portion 802 is electrically connected to the conductive pin 1002 to enable an electrical signal to be conducted or transmitted from the electrode plate 801 to the pin 1002.

In various exemplary implementations, the wing portion can be arranged at multiple positions along the planar portion of the support plate, for example:

Configuration 1: The wing portion is located in the middle of multiple electrode plates (as shown in FIGS. 2, 3, 4, 5, 6, 7, 11, 12, and 13).

Configuration 2: The wing portion is located at the first end of each electrode plate in the plurality of electrode plates, and the distance between the first end of each electrode plate and the metal cover plate is smaller than the distance between the second end of each electrode plate and the metal cover plate.

Preferably, the conductive part is located at a position that offset a distance from the planar portion of the electrode plate. The conductive pin is connected to the conductive part. In a preferred embodiment, the conductive pin is electrically connected to an attachment portion of the conductive part for signal conduction or transmission between the electrode plate to the conductive pin.

In the exemplary implementations, a first surface or attachment portion of the conductive part is connected to the conductive pin; or, a second surface of the conductive part is connected to the conductive pin. As such, a variety of configurations can be employed to connect the wing portion to the conductive pin, and different positions of the conductive pin can be accommodated, which improves the diversity of possible connections.

In the exemplary implementations, in order to ensure the accuracy of the measurement of the liquid level sensor, the interval or distance between the electrode plates should be kept constant. Using multiple support plates (e.g., 2 support plates), one of the multiple support plates can be arranged at a first end of the electrode plates. The other support plate of the multiple support plates can be arranged at a second end of the electrode plates. Alternatively, one support plate of the multiple support plates can be arranged at a second end of the electrode plates, and the other support plate of the multiple support plates can be arranged between the wing portion and the second end of the electrode plates. Multiple support plates are used to ensure a constant interval or gap, and the support plates can be arranged in a variety of ways, which improves the diversity of the support plate settings, ensures a constant interval, and improves the accuracy of the liquid level sensor measurement.

Preferably, a plurality of electrode plates are arranged so the respective planar portions of the electrode planes are parallel to one another and the respective wing portions of the electrode planes extend outwardly from the planar portions in a direction away from one another.

In this embodiment, one or more convex parts (i.e., pads or protrusions are provided on the conductive part of the wing portion. This arrangement can make the welding of the conductive pin to the conductive part more precise, make the connection between the electrode plate and the conductive pin more stable, and make the measurement of the liquid level sensor more accurate.

The following describes with multiple examples.

Example One

Figure 2:
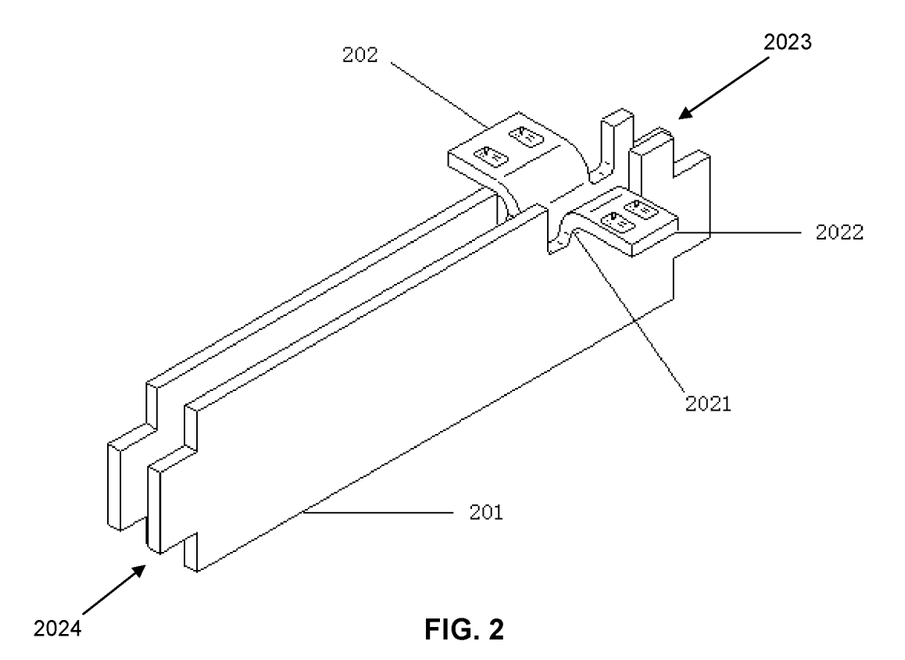
FIG. 2 is a schematic diagram of an electrode plate according to an embodiment of the present disclosure.
Figure 3:
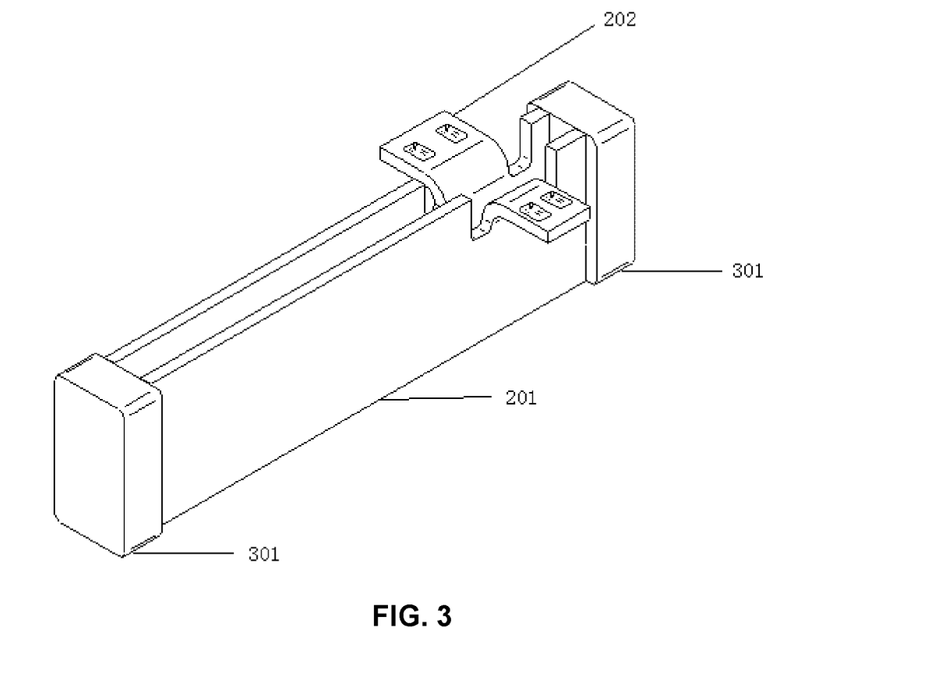
FIG. 3 is a first schematic diagram of a support plate according to an embodiment of the present disclosure.
Figure 4:
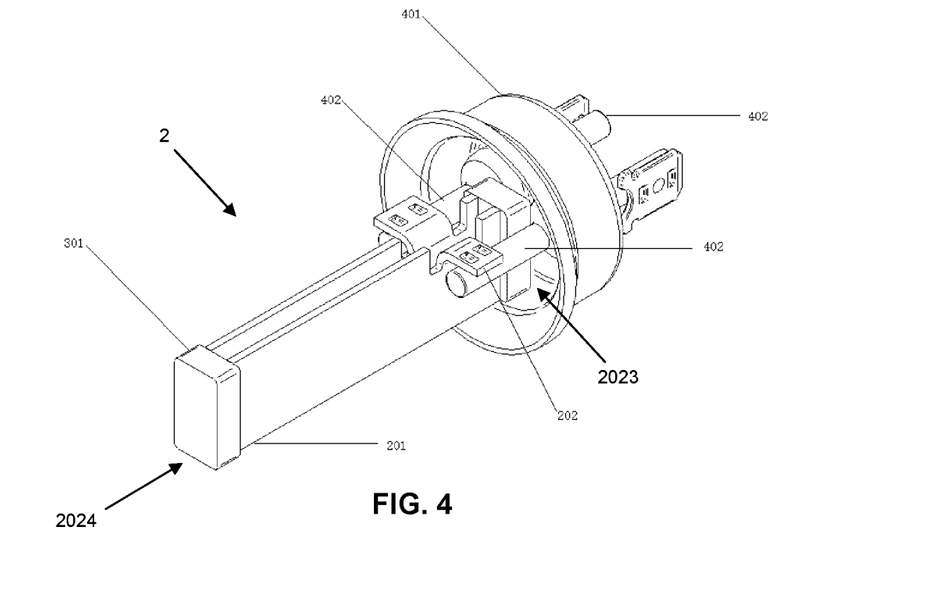
FIG. 4 is a schematic diagram of a liquid level sensor according to an embodiment of the present disclosure.

This embodiment provides a liquid level sensor as shown in FIGS. 2, 3 and 4.

The liquid level sensor includes a metal cover plate 401, a plurality of conductive pins 402, each conductive pin passing through the metal cover plate 401, a plurality of electrode plates 201, a plurality of support plates 301, each support plate 301 supporting the plurality of electrode plates 201, so that the plurality of electrode plates 201 maintain a fixed interval, gap or distance. Each electrode plate 201 of the electrode plate 201 includes a wing portion 202 extending outward from a planar portion of the electrode plate 201, and the conductive pin 402 is connected to the wing portion 202.

In this preferred embodiment, the wing portion 202 has a bent part 2021 and a conductive part 2022. The bent part 2021 can provide a certain amount of metal elasticity, and provide buffer elasticity for the electrode plate 201 and the respective connected conductive pin 402. In various working environments of the liquid level sensor, this can improve the stability of the connection between the electrode plate and the conductive pin, and the conductive part is connected to the conductive pin for signal conduction or transmission.

In this embodiment, the wing portion 202 is located in the middle of the plurality of electrode plates 201 (i.e., between a first end 2023 and a second end 2024 of the electrode plates 201). Such an implementation is convenient for production.

Example Two

Figure 5:
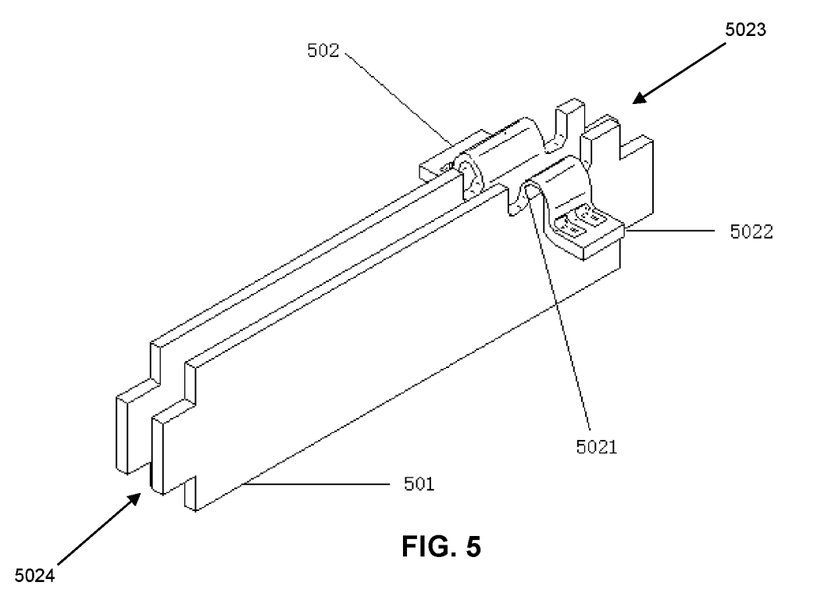
FIG. 5 is a second schematic diagram of an electrode plate according to an embodiment of the present disclosure.
Figure 6:
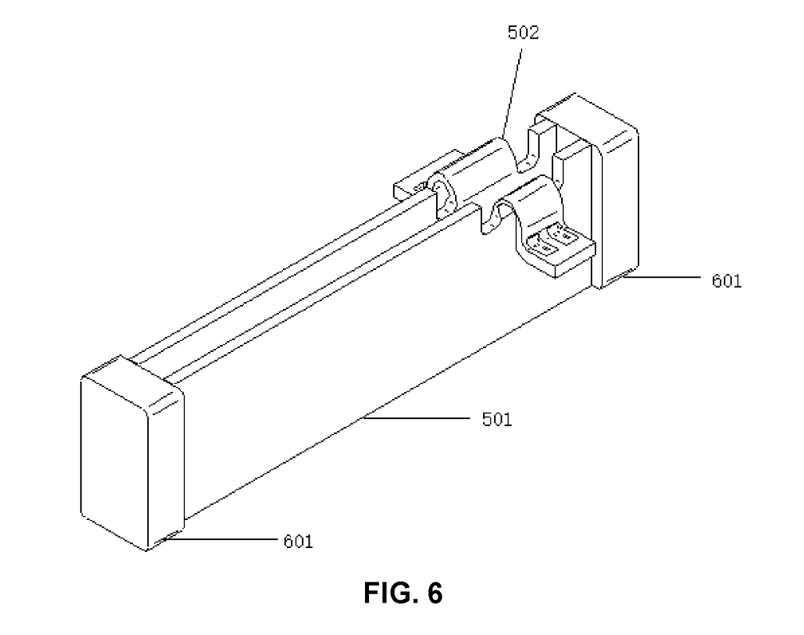
FIG. 6 is a second schematic diagram of a support plate according to an embodiment of the present disclosure.
Figure 7:
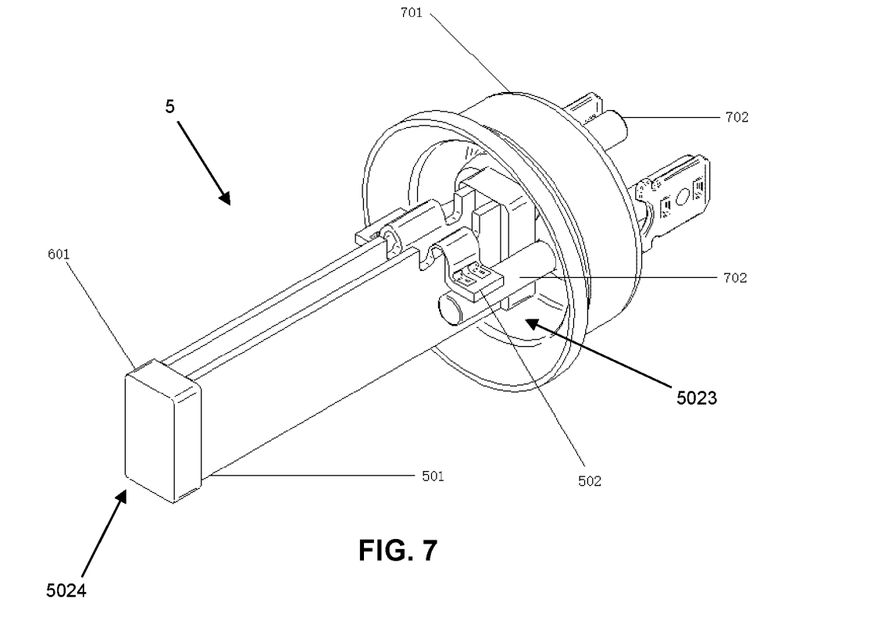
FIG. 7 is a second schematic diagram of a liquid level sensor according to an embodiment of the present disclosure.

This embodiment provides a liquid level sensor as shown in FIGS. 5, 6 and 7.

The liquid level sensor can include a metal cover plate 701, at least one conductive pin 702 passing through the metal cover plate 701, multiple electrode plates 501, multiple support plates 501, each supporting, the electrode plates 501 so that a fixed interval, gap or distance between the multiple electrode plates 501 is maintained. Each electrode plate 501 of the multiple electrode plate 501 includes a wing portion 502 extending outward from a planar portion of the electrode plate 501. The wing portion 502 is connected to the conductive pin 702.

The wing portion 502 includes a bent part 5021 and a conductive part 5022. The bent part can provide a certain amount of metal elasticity, and provide buffer elasticity for the electrode plate and the connected conductive pin. In various working environments of the liquid level sensor this can improve the stability of the connection between the electrode plate and the conductive pin, and the conductive part is electrically connected to the conductive pin for signal transmission.

In this embodiment, the wing portion 502 is located in the middle of the plurality of electrode plates 501 (i.e., between a first end 5023 and a second end 5024 of the electrode plates 501). Such an implementation is convenient for production.

Example Three

This embodiment provides a liquid level sensor as shown in FIGS. 8, 9 and 10.

The liquid level sensor includes a metal cover plate 1001, at least one conductive pin 1002 passing through the metal cover plate 1001, a plurality of electrode plates 801, a plurality of support plates 901 supporting the plurality of electrode plates 801 so that the plurality of electrode plates 801 maintain a fixed interval, gap or distance from one another. Each electrode plate 801 includes a wing portion 802 extending outward from a planar portion of the electrode plate 801. A corresponding conductive pin 1002 is connected to each wing portion 802.

In this preferred embodiment, the wing portion has a bent portion or part 8021 and a conductive portion or part 8022. The bent part can provide a certain amount of metal elasticity, and provide buffer elasticity for the electrode plate and the connected conductive pin. In various working environments of the liquid level sensor, this can improve the stability of the connection between the electrode plate and the conductive pin. The conductive part is electrically connected to the conductive pin for signal conduction or transmission.

In this embodiment, the wing portion 802 is located at the first end 8023 of each electrode plate 801 of the plurality of electrode plates, and a distance between the first end 8023 and the metal cover plate 1001 is less than a distance between the second end 8024 of each electrode plate 801 and the metal cover plate 1001. As shown in the example of FIG. 10, a first support plate 901 may be positioned between the winged portion 802 and the second end 8024, and a second support plate 901 may be positioned at the second end 8024. In some embodiments, for example as shown in FIG. 10, the distal perimeter of the of the flanged portion 808 of the peripheral side wall 807 may define a plane, and the winged portion 802, the first support plate 901 and the second support plate 901 may each be positioned on a side of the plane opposite a side of the plane that the metal cover plate 1001 is located on. In some examples, such as shown in FIG. 10, the winged portion 802, the first support plate 901, and the second support plate 901 may each be positioned outside of the cavity defined by the metal cover plate 1001 and peripheral side wall 807, including the flanged portion 808 of the peripheral side wall 807. Such an embodiment makes the relative area of the electrode plate relatively intact (i.e., continuous) and can improve the accuracy of the liquid level sensor measurement.

Example Four

Figure 11:
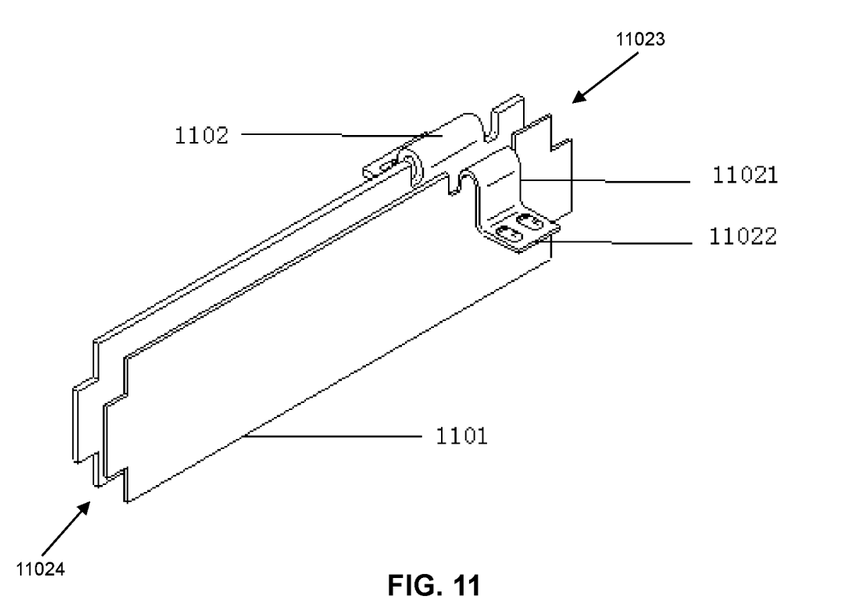
FIG. 11 is a fourth schematic diagram of an electrode plate according to an embodiment of the present disclosure.
Figure 12:
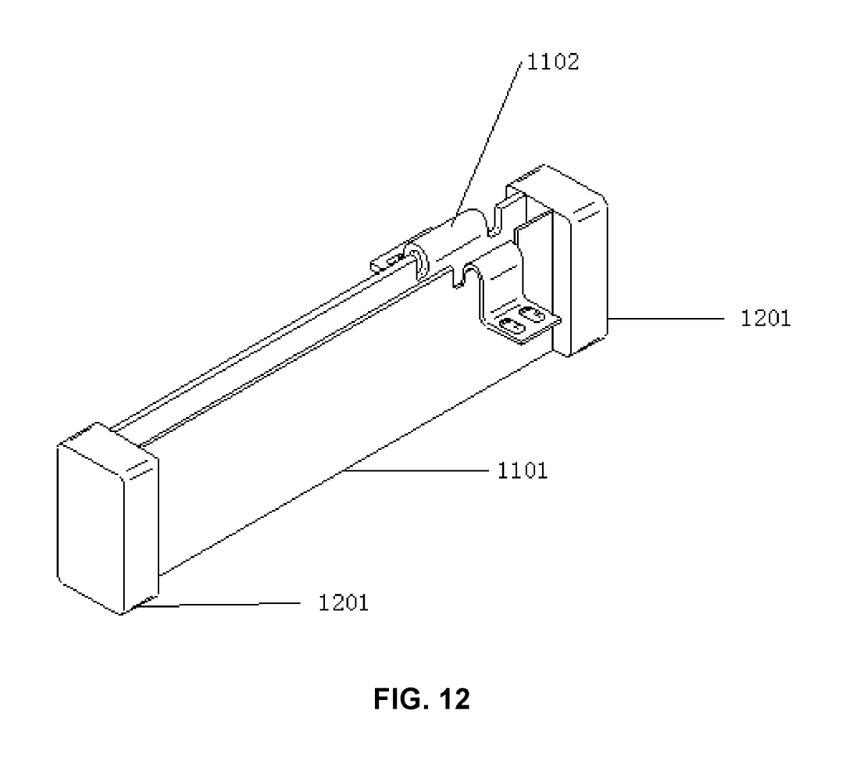
FIG. 12 is a fourth schematic diagram of a support plate according to an embodiment of the present disclosure.
Figure 13:
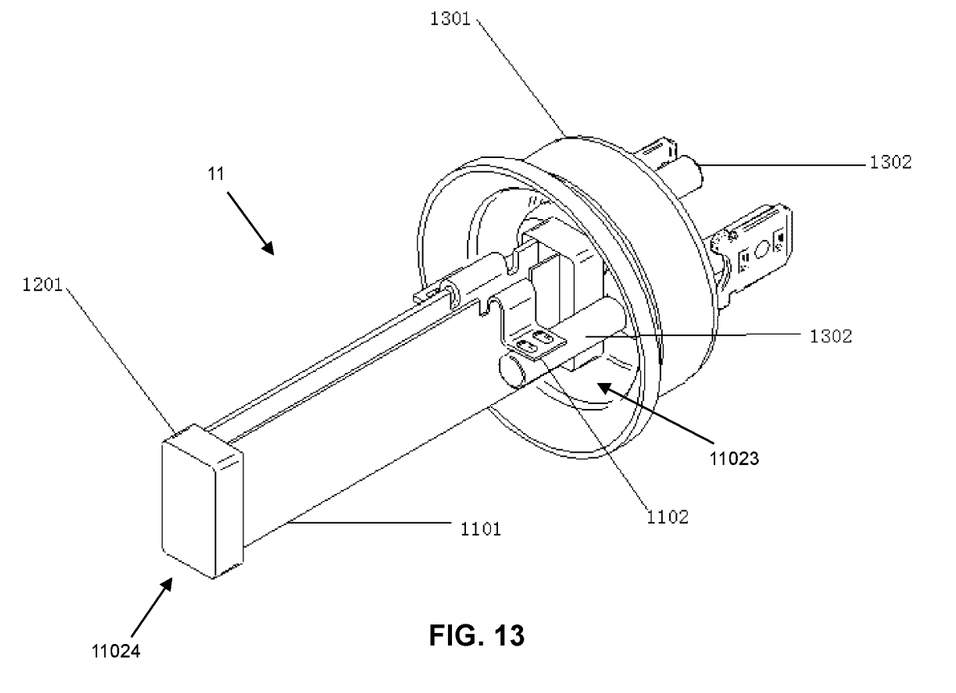
FIG. 13 is a fourth schematic diagram of a liquid level sensor according to an embodiment of the present disclosure.

This embodiment provides a liquid level sensor, as shown in FIGS. 11, 12 and 13.

The liquid level sensor includes a metal cover 1301, a plurality of conductive pins 1302, each conductive pin penetrating or passing through the metal cover 1301, a plurality of electrode plates 1101, a plurality of support plates 1201, each supporting the plurality of electrode plates 1101 so that the multiple electrode plates 1101 are maintained at a fixed interval, gap or distance apart from one another. Each electrode plate 1101 of the plurality of electrode plates 1101 has a wing portion 1102, the wing portion 1102 extending outward from a planar portion of the electrode plate 1101, and the wing portion 1102 is connected to a conductive pin 1302.

In this preferred embodiment, the wing portion 1102 includes a bent part or portion 11021 and a conductive part or portion 11022. The bent part can provide a certain amount of metal elasticity, and provide buffer elasticity for the electrode plate and the connected conductive pin. In various working environments of the liquid level sensor, this can improve the stability of the connection between the electrode plate and the conductive pin. The conductive part is electrically connected to the conductive pin for signal conduction or transmission.

In this embodiment, the wing portion 1102 is located intermediate the opposite ends 11023 and 11024 of the plurality of electrode plates 1101. Such an implementation is convenient for production.

To sum up, through the above technical solutions in the present invention, the liquid level sensor includes: a metal cover plate; a conductive pin through which the conductive pin penetrates the metal cover plate; a plurality of electrode plates; and a plurality of support plates supporting the plurality of electrode plates respectively, so that a fixed interval is maintained between the plurality of electrode plates; each electrode plate of the plurality of electrode plates has a wing portion, the wing portion is connected to the conductive pin, and the wing portion extends outward from each electrode plate. The wing portion and the electrode plate are integrally formed, and the wing portion is connected to the conductive pin, which improves the stability of the connection between the electrode plate and the conductive pin and improves the working stability of the liquid level sensor.

The above mentioned is merely the preferred embodiments of the present invention but not to limit the present invention. Various alterations and changes to the present invention are apparent to the person skilled in the art. Any modifications, equivalent substitutions, improvements etc. within the spirit and principle of the present invention should be covered by the protection scope of the present invention.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A liquid level sensor comprising:
a metal cover comprising a cap-shaped body member having a generally flat top surface including at least one aperture, a peripheral side wall extending from the top surface and including a flanged portion at a distal perimeter of the side wall, the distal perimeter of the side wall defining a plane;
a plurality of conductive pins extending through the at least one aperture in the top surface of the body member and extending from a first side of the metal cover to a second side of the metal cover;
a sealing glass disposed between each of the plurality of pins and the at least one aperture to hermetically seal the pins to the body member and electrically isolate to the pins from the body member and one another;
a plurality of generally rectangular-shaped electrically-conductive electrode plates extending from the second side of the cover, each of the electrode plates comprising a proximal end closest to the cover, a distal end furthest from the cover and a planar portion;
a plurality of electrically-insulating support plates comprising a proximal support plate and a distal support plate supporting the plurality of electrode plates;
wherein the electrode plates are positioned in an adjacent relationship to one another such that the planar portions of respective adjacent electrode plates are generally parallel to one another and separated by a predetermined gap;
wherein the proximal end of each electrode plate of the plurality of electrode plates includes an integrally-formed wing portion that extends laterally outward from the planar portion of the electrode plate;

wherein each of the conductive pins of the plurality of conductive pins is attached to the wing portion of a corresponding electrode plate of the plurality of electrode plates; and wherein the proximal end of each electrode plate of the plurality of electrode plates is positioned on a side of the plane opposite the generally flat top surface;

wherein the distal support plate is located at the distal end of each electrode plate of the plurality of electrode plates; and wherein the proximal support plate is next to the wing portion of each electrode plate of the plurality of support plates and intermediate the wing portion of each electrode plate of the plurality of support plates and the distal support plate.

2. The liquid level sensor according to claim 1 wherein the planar portions of each of the plurality of electrode plates comprises a first thickness and the wing portions of each of the plurality of electrode plates comprises a second thickness; and wherein the second thickness is substantially the same as the first thickness.

3. A liquid level sensor, comprising:
a plurality of generally rectangular-shaped electrically-conductive electrode plates, each of the electrode plates comprising a planar portion and a first end opposite a second end;
wherein each electrode plate of the plurality of electrode plates includes an integrally-formed wing portion that extends laterally outward from the planar portion of the electrode plate;
wherein each wing portion is formed at the first end of each electrode plate;
a first electrically-insulating support plate supporting the plurality of electrode plates and a second electrically-insulating support plate supporting the plurality of electrode plates; and
wherein the second electrically-insulating support plate is located at the second end of each electrode plate and the first electrically-insulating support plate is located next to the wing portion of each electrically-conductive electrode plate and between the first end of each electrode plate and the wing portion of each electrode plate.

4. The liquid level sensor of claim 3, wherein each electrode plate of the plurality of electrode plates is substantially formed from a first material and each wing portion is substantially formed from a second material; and
wherein the first material is substantially the same as the second material.

5. The liquid level sensor of claim 3, wherein the planar portions of each of the plurality of electrode plates comprise a first thickness and the wing portions of each of the plurality of electrode plates comprise a second thickness; and
wherein the first thickness is substantially the same as the second thickness.

6. The liquid level sensor of claim 3, further comprising:
a metal cover comprising a cap-shaped body member having a generally flat top surface including at least one aperture, a peripheral side wall extending from the top surface and including a flanged portion at a distal perimeter of the side wall;
a plurality of conductive pins extending through the at least one aperture in the top surface of the body member and extending from a first side of the metal cover to a second side of the metal cover;
wherein each wing portion comprises a bent portion and an attachment portion that is laterally spaced apart from the planar portion of the electrode plate; and
wherein each conductive pin of the plurality of conductive pins is attached to the attachment portion of the wing portion of the corresponding electrode plate of the plurality of electrode plates.

7. The liquid level sensor of claim 6, wherein the distal perimeter of the side wall defines a plane; and
wherein each wing portion is positioned on a side of the plane opposite the generally flat top surface.

8. The liquid level sensor of claim 6, wherein the generally flat top surface and the peripheral side wall define a cavity; and
wherein each wing portion is positioned outside the cavity.

9. The liquid level sensor of claim 6, wherein the distal perimeter of the side wall defines a plane; and
wherein the first electrically-insulating support plate is positioned on a side of the plane opposite the generally flat top surface.

10. The liquid level sensor of claim 6, wherein the generally flat top surface and the peripheral side wall define a cavity; and
wherein the first electrically-insulating support plate is positioned outside the cavity.

11. The liquid level sensor of claim 6, further comprising:
a sealing glass disposed between each of the plurality of pins and the at least one aperture to hermetically seal the pins to the body member and electrically isolate the pins from the body member and one another.

12. The liquid level sensor of claim 6, wherein each electrode plate of the plurality of generally rectangular-shaped electrically-conductive electrode plates extends from the second side of the cover.

13. The liquid level sensor of claim 6, wherein a distance between the generally flat top surface and each wing portion is greater than a distance between the generally flat top surface and the distal perimeter of the side wall.

14. The liquid level sensor of claim 6, wherein a distance between the generally flat top surface and the second first electrically-insulating support plate is greater than a distance between the generally flat top surface and the distal perimeter of the side wall.

15. The liquid level sensor of claim 3, wherein the planar portions of each of the plurality of electrode plates comprises a first modulus of elasticity and the wing portions of each of the plurality of electrode plates comprise a second modulus of elasticity; and
wherein the first modulus of elasticity is substantially the same as the second modulus of elasticity.

16. The liquid level sensor of claim 3, wherein the planar portion of each electrode plate is substantially parallel with the planar portion of each other electrode plate.

17. A capacitive liquid level sensor, comprising:
a pair of generally rectangular-shaped and planar electrode plates extending from a first end to a second end opposite the first end;
a first insulator and a second insulator supporting the pair of electrode plates adjacent to one another such that the pair of electrode plates are arranged generally parallel to one another and separated by a predetermined gap;
wherein the first end of each of the pair of electrode plates includes an integrally-formed wing portion that extends laterally from the electrode plate in a direction away from the adjacent electrode plate;

wherein the second insulator is disposed at the second end of each electrode plate; and wherein the first insulator is disposed proximate to the wing portion of each electrode plate and in a space between the first end and the second end of the electrode plates such that the wing portions of the electrode plates are disposed outside of the space between the first insulator and the second insulator.

18. The capacitive liquid level sensor of claim 17, wherein:

each generally rectangular-shaped and planar electrode plate comprises a first material;

each integrally-formed wing portion comprises a second material; and the first material is substantially the same as the second material.

19. The capacitive liquid level sensor of claim 17, wherein the wing portions of the electrode plates are disposed at the second end of the respective electrode plate.

\* \* \* \* \*

UNITED STATES PATENT AND TRADEMARK OFFICE
CERTIFICATE OF CORRECTION

| | |
|---|---|
| PATENT NO. | : 12,130,165 B2 |
| APPLICATION NO. | : 17/922880 |
| DATED | : October 29, 2024 |
| INVENTOR(S) | : Wenjie Wu et al. |

Page 1 of 1

It is certified that error appears in the above-identified patent and that said Letters Patent is hereby corrected as shown below:

In the Claims

Column 10,
Claim number 14, Line 42, before "first", delete "second".

Signed and Sealed this
Tenth Day of December, 2024

*Katherine Kelly Vidal*

Katherine Kelly Vidal
*Director of the United States Patent and Trademark Office*